May 22, 1928.
J. F. O'CONNOR
1,670,478
FRICTION SHOCK ABSORBING MECHANISM
Filed March 13, 1926    2 Sheets-Sheet 1
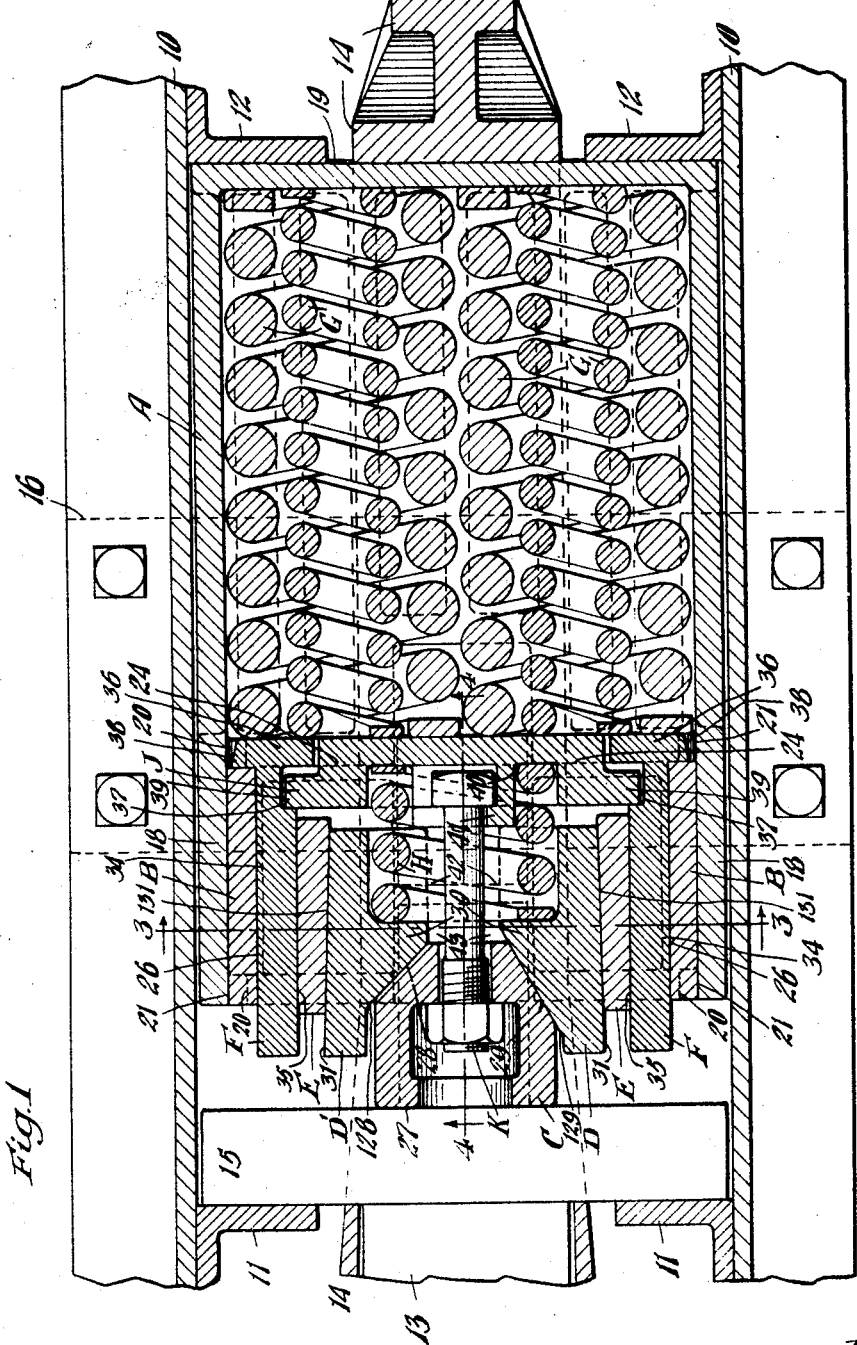
Witness
Wm. Geiger
Inventor
John F. O'Connor
By George I. Haight
His Atty.

May 22, 1928.  
J. F. O'CONNOR  
1,670,478  
FRICTION SHOCK ABSORBING MECHANISM  
Filed March 13, 1926 — 2 Sheets-Sheet 2
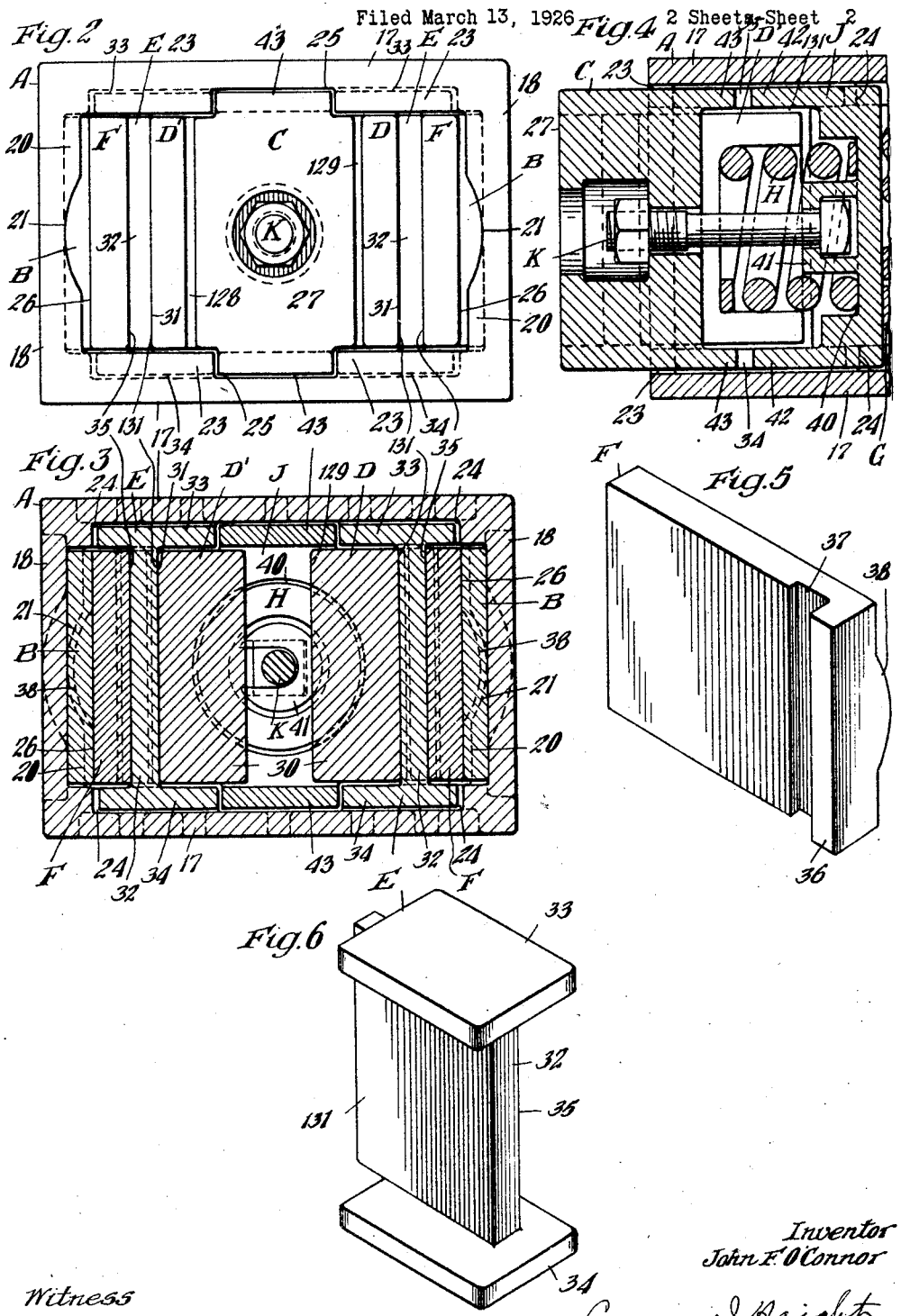
Inventor  
John F. O'Connor  
By George I. Haight  
His Atty.
Witness  
Wm. Geiger Patented May 22, 1928.

1,670,478

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 13, 1926. Serial No. 94,366.

This invention relates to improvements in friction shock absorbing mechanisms.

One object of the invention is to provide a friction shock absorbing mechanism of high capacity, especially adapted for railway draft riggings, including a plurality of relatively movable friction elements, wherein the movable elements are directly actuated by means independent of the usual main follower.

Another object of the invention is to provide a friction shock absorbing mechanism including a plurality of relatively movable friction elements, spring resistance means and means for placing the friction elements under lateral pressure, including a wedge element, wherein means is provided for releasing the wedge element directly through the medium of the main spring resistance.

A further object of the invention is to provide a mechanism of the character indicated, including a plurality of relatively movable friction plates, spreading means, a spring resistance and a spring follower, wherein all of the plates are movable as a unit during a predetermined initial action of the mechanism to provide for relatively light preliminary resistance to absorb light shocks, followed by a heavier resistance during which the plates are moved relatively to each other through the medium of the spring follower.

Other objects and advantages of my invention will more fully and clearly appear from the description and claims hereinafter following.

In the drawings, forming a part of this specification, Figure 1 is a longitudinal, horizontal, sectional view of a portion of a railway draft rigging, showing the improvements in connection therewith. Figure 2 is a front end elevational view of the shock absorbing mechanism proper. Figure 3 is a transverse, vertical, sectional view, corresponding substantially to the line 3—3 of Figure 1. Figure 4 is a longitudinal, vertical, sectional view of the front end of the shock absorbing mechanism proper, corresponding substantially to the line 4—4 of Figure 1. And Figures 5 and 6 are detailed, perspective views of two different friction plates employed in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13, to which is operatively connected a yoke 14 of well-known form. The shock absorbing mechanism proper, as well as a front main follower 15, is disposed within the yoke, and the yoke and the parts therewithin are in turn supported by a detachable saddle plate 16 fixed to the draft sills.

The improved shock absorbing mechanism proper, as shown, comprises broadly, a casing A; a pair of liners B—B; a main wedge C; a pair of friction shoes D—D'; a pair of plates E—E, mounted for limited longitudinal movement; a pair of plates F—F, longitudinally movable; a main spring resistance G; an auxiliary spring resistance H; a spring follower J; and a retainer bolt K.

The casing A is of generally rectangular box-like form having horizontally disposed spaced, top and bottom walls 17—17; longitudinally extending vertically disposed spaced side walls 18—18; and a transverse rear end wall 19. The end wall 19 co-operates with the stop lugs 12 in the manner of the usual rear follower. Adjacent the front end of the casing, each side wall 18 is provided with a pair of inwardly projecting flanges 20—20, one of the flanges of each pair coinciding with the front end of the casing and the other flanges being spaced rearwardly thereof. The flanges 20 are centrally cut away as indicated at 21—21, to permit insertion of the springs G. The top and bottom walls 17 of the casing are provided with outer ribs and inner shoulders 23 and 24, respectively, extending transversely of the casing. The ribs 23 are centrally cut away as indicated at 25 to accommodate the upper and lower portions of the wedge member C. As shown, the ribs 23 of the top and bottom walls 17 are in vertical alinement and are located at the outer extremity of the casing. The shoulders 24 of the top and bottom walls are also in vertical alinement and are spaced inwardly an appreciable distance from the ribs 23.

The liners B are in the form of heavy rectangular plate-like members and are disposed at opposite sides of the casing between the outer and inner flanges 20 of the corresponding side wall 18. The liners fit snugly between these flanges and are held against longitudinal movement with reference to the casing. On the inner side, each liner B is provided with a flat longitudinal extending friction surface 26 adapted to co-operate with the corresponding friction plate F.

The wedge block C is in the form of a hollow casting having a front flat end face 27 adapted to bear on the inner side of the front follower 15. At the inner end, the block C is provided with a pair of wedge faces 28 and 29 at the opposite sides thereof, the wedge face 28 being disposed at a relatively blunt angle with reference to the longitudinal axis of the mechanism while the wedge face 29 is disposed at a relatively keen angle with reference to said axis.

The friction shoes D—D', which are two in number, are disposed at opposite sides of the mechanism and co-operate with the wedge block C. The shoes D and D' are of the same design except as hereinafter pointed out. Each of the shoes has a lateral enlargement 30 on the inner side thereof provided with a transverse rear flat face and an outer wedge face at the front side thereof. The wedge face of the shoe D is indicated by 129 and is correspondingly inclined to and adapted to co-operate with the keen wedge face 29 of the wedge block C, and the wedge face of the shoe D' is indicated by 128 and is correspondingly inclined to and adapted to co-operate with the blunt wedge face 28 of the block C. Each shoe is provided with a longitudinally disposed flat friction surface 31 on the outer side thereof adapted to co-operate with the corresponding friction plate E.

The friction plates E are two in number and are disposed at opposite sides of the friction shoes. The two plates E are of the same design and as most clearly shown in Figure 6, each plate comprises a central flat section 32 and horizontally disposed, top and bottom plate-like sections 33 and 34 formed integral with the section 32. The sections 33 and 34, as shown, project laterally beyond the opposite sides of the section 32 in the manner of flanges. The plate section 32 is longitudinally off-set with reference to the sections 33 and 34, as clearly shown in Figures 1 and 2, so that the rear end of the plate section 32 is spaced forwardly from the corresponding ends of the sections 33 and 34 and the front end of the plate 32 projects beyond the front edges of the top and bottom sections 33 and 34. The plate-like sections 33 and 34 are disposed between the ribs 23 and the shoulders 24 on the top and bottom walls 17 of the casing A. The distance between each rib 23 and the corresponding shoulder 24 is greater than the longitudinal dimension of the corresponding plate sections of the members E, thereby permitting a limited relative movement between the friction plates E and the casing A. The plate-like section 32 of each friction element E has longitudinally disposed friction surfaces on the opposite sides thereof, the outer surface being indicated by 35 and co-operating with the corresponding friction element F. The inner friction surface of the plate section 32 is indicated by 131 and co-operates with the friction surface 31 of the corresponding friction shoe. As most clearly shown in Figure 1, the co-operating friction surfaces 31 and 131 of the plates E and the shoes are slightly inclined with reference to the longitudinal axis of the mechanism to provide for differential action.

The friction plates F, which are two in number, are disposed at opposite sides of the mechanism and are interposed between the liner elements B and the friction plates E. The plates F are of identical design and as most clearly shown in Figure 5, each plate is provided with an inwardly projecting lateral flange 36 at the inner end thereof. Forwardly of the flange 36, the plate is vertically grooved, as indicated at 37, for a purpose hereinafter described. At the rear end of each plate F, on the outer side thereof, a relatively short central flange 38 is provided. As shown in Figures 1 and 5, the flange 38 has a curved outer edge corresponding substantially to the curvature of the cut away portions 21 of the flanges 20 on the corresponding side wall of the casing A. Each plate F has flat, longitudinally disposed, friction surfaces on the opposite sides thereof co-operating respectively with the friction surface of the liner B and the friction surface of the adjacent plate E at the corresponding side of the mechanism. The inter-engaging friction surfaces of the plates F and the liners B, as well as the co-operating surfaces of the plates E and F, are preferably all disposed parallel to the longitudinal axis of the mechanism.

The spring follower J comprises a main body portion in the form of a relatively heavy plate provided with lateral flanges 39—39 at the opposite sides thereof, the flanges 39 being offset forwardly with reference to the main body portion of the follower. The front face of the follower J is centrally recessed as indicated at 40 to provide a seat for the rear end of the spring resistance H. The spring follower J is also provided with a forwardly projecting central lug 41, to which the inner end of the retainer bolt K is detachably anchored. The lateral flanges 39 of the spring follower J are accommodated within the vertical openings 37 of the plates F. The front and rear walls of the vertical opening 37 of each plate are spaced apart a greater distance than the thickness of the corresponding flange 39 of the spring follower J, thereby providing a limited amount of relative movement between the spring follower and the plates F. The spring follower J has top and bottom arms 42—42 forwardly extending therefrom, the same being in alinement with similar short arms 43—43 extending rearwardly from the wedge block C. As shown in Figures 1 and 4, the adjacent ends of the arms 42 and 43 are normally spaced apart so that there will be relative movement between the wedge and the spring follower J to a limited extent, before these two members move in unison.

The spring resistance element G comprises two units in twin arrangement. Each unit comprises a relatively heavy outer coil and a lighter inner coil, the opposite ends of the coils bearing respectively on the transverse rear end wall 19 of the casing A and the rear face of the spring follower. As most clearly shown in Figure 1, each of the spring units also has the front end thereof bearing on the inner end of the friction plate F at the corresponding side of the mechanism. The spring resistance G is placed under initial compression when the parts are assembled and in the position shown in Figure 1.

The auxiliary spring resistance H, which is in the form of a single coil, is interposed between the enlargements on the friction shoes D—D', and the front of the spring follower J, the inner end of the coil H being seated in the opening 40 of the spring follower.

The retainer bolt K has the opposite ends thereof anchored to the spring follower J and the wedge block C, the head of the bolt being seated in a recess in the lug 41 of the spring follower and the nut of the bolt being accommodated within the hollow portion of the block C. The bolt K is so adjusted as to maintain the auxiliary spring H under an initial compression when the parts are in the full release position of the mechanism. In addition to holding the parts under compression, the bolt K serves to hold the same assembled.

In assembling the mechanism, the spring follower J and the movable plates F, together with the main spring resistance elements G, are first inserted into the casing A through the front end thereof. The liners B are next placed in position, the plates F being tilted inwardly to permit insertion of the liners between the flanges 20 of the side walls of the casing. When the parts have been thus assembled, the two plates F are successively inserted in the casing by passing the flanges 33 and 34 thereof through the openings 25 of the ribs 23 and sliding each plate laterally to dispose the top and bottom sections thereof between the ribs 23 and the shoulders 24 of the casing A. The auxiliary spring resistance H, friction shoes D and D' and the wedge blocks C are then assembled, and secured in position by the retainer bolt K.

Figure 1 of the drawings shows the full release position of the parts of the mechanism. As shown in this figure, the flanges 38 of the plates F engage the inner ends of the liners B and are thus held against outward movement with reference to the casing A. The spring follower J has the flanges 39 thereof engaging the outer end walls of the openings 37 of the plates F, a certain amount of clearance being thus provided between the rear faces of the flanges 39 and the inner end walls of these recesses 37. The friction plates E are disposed in their outermost position with the front edges of the plate sections 33 and 34 thereof in engagement with the ribs 23 of the casing, the inner ends of the sections 33 and 34 being spaced from the shoulders 24, as shown. In this position of the parts, the inner ends of the friction shoes are also spaced outwardly from the front face of the spring follower J and the extensions 43 of the wedge block C are spaced from the outer ends of the extensions 42 on the spring follower J, as most clearly shown in Figure 4.

The operation of my improved shock absorbing mechanism upon a compression stroke, is as follows: The front follower 15 and the wedge block C will be moved inwardly toward the casing A, thereby setting up a wedging action between the keen face of the block C and the keen angled shoe D. During this time, there will be substantially no wedging action between the blunt co-acting faces of the block C and the shoe D'. During this action, the auxiliary spring resistance H will be compressed and the shoes D and D' will be forced inwardly of the mechanism. Due to the spreading action of the wedge C, and the friction created thereby between the shoes and the friction plates E, the latter will be carried inwardly of the mechanism with the shoes, sliding on the movable friction plates F which are held in their outermost position during this stage of the operaton by the main spring resistance element G. The described action will continue until the inner ends of the plate like sections 33 and 34 of the friction plates E come into abutment with the limiting shoulders 24 of the casing A, whereupon movement of the plates E will be arrested, thereby forcing the shoes D and D' to slip on the plates E. The wedge C and the shoes D and D' will move inwardly with reference to the plates E until the extensions 43 on the wedge block engage the extensions 42 on the spring follower J, whereupon the latter will be carried inwardly in unison with the wedge and friction shoes. During the inward movement of the spring follower J as described, the clearance between the flanges 39 and the inner end walls of the openings 37 will be taken up, whereupon the plates F will be carried inwardly with the spring follower J, greatly augmenting the frictional resistance. The movement of the parts as described, will continue either until the actuating force is reduced or the main follower 15 engages the outer end of the casing A, whereupon the pressure will be transmitted directly through the casing to the draft sills.

It will be evident that there will be substantially no wedging action between the blunt faces of the wedge and shoe D' while a true wedging action will be effected between the co-acting keen faces of the wedge and the shoe D. On account of this arrangement, of blunt and keen wedge faces, the releasing action of the mechanism will be greatly facilitated by the employment of the blunt and keen sets of wedge faces. I am also enabled to obtain a very high wedging action during the compression stroke, since the keen wedge faces may be made relatively acute without danger of the parts sticking, the blunt wedge faces acting to insure the release. In this connection, it will be understood that my improvements are capable of use in a mechanism either employing a blunt and keen angle set of wedge faces, or wedge faces which are all of the same angle with respect to the axis of the mechanism.

When the actuating force is reduced, the expansive action of the spring resistance G will first cause release of the wedging system by forcing the wedge outwardly with reference to the friction shoes due to the action of the spring follower, which has the forwardly projecting arms thereof engaging the inner ends of the arms on the wedge block when the mechanism has been compressed. Inasmuch as the spring follower J is moved inwardly with reference to the plates F during the early compression of the mechanism, a clearance will be provided between the lugs 39 of the follower and the outer walls of the openings 37 of the plates F, thereby permitting the necessary relative movement between the spring follower J and the plates F during the initial release of the mechanism to project the wedge outwardly without effecting movement of the plates F. In this connection, it is also pointed out that the parts are so proportioned and arranged that there will be a slight clearance between the inner ends of the friction shoes and the front face of the spring follower J when the mechanism is fully compressed. In other words, the inter-engaging arms of the wedge block C and the spring follower J will abut before the shoes D and D' engage the outer face of the spring follower J. During the outward movement of the friction plates F, the shoes and friction plates E will be carried outwardly in unison therewith due to the friction existing between these parts. Outward movement of the plates E will be limited by the outer edges of the plate-like sections 33 and 34 thereof coming into abutment with the ribs 23 and the casing A. Outward movement of the wedge block and shoes D and D' will be limited by the retainer bolt. The shoes D and D' and the wedge block C are restored to their outermost position by the expansive action of the auxiliary spring resistance H.

From the preceding description taken in connection with the drawings, it will be evident that I have provided a mechanism of high shock absorbing capacity which is sturdy and has great column strength, and wherein release of the wedge block is assured, the entire available main spring capacity being utilized during the initial releasing action to force the wedge outwardly with reference to the shoes and other parts of the friction system.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a column load sustaining member having longitudinally disposed friction surfaces; of a main follower, said follower and member being relatively movable; longitudinally movable friction plates co-operating with the friction surfaces of said column member; a main spring resistance; a spring follower co-operating with said spring resistance; additional plates held against longitudinal movement during the compression stroke of the mechanism and co-operating with the movable plates; a friction wedge system including a wedge member and friction shoes, said wedge member bearing on the main follower and being engageable with the spring follower to effect movement of the latter; and co-operating means on the movable plates and spring follower for effecting movement of said plates.

2. In a friction shock absorbing mechanism, the combination with a column load sustaining member having longitudinally disposed friction surfaces; of a main follower, said follower and member being relatively movable; a plurality of relatively movable friction elements co-operating with said column member; a spring resistance; a spring follower co-operating with said spring resistance; a friction wedge system including friction shoes co-operating with the friction elements, and a wedge engaging the main follower, said wedge also engaging the spring follower during compression of the mechanism to effect movement of the same; and means on said spring follower engaging certain of said friction elements to effect movement thereof with reference to the remaining friction elements.

3. In a friction shock absorbing mechanism, the combination with a friction shell having interior friction surfaces; of a plurality of intercalated, relatively movable friction plates co-operating with the friction shell; spreading means including a wedge member and friction shoes co-operating with said plates; a spring resistance; and spring follower actuated by the wedge member upon inward movement thereof, and a lost-motion connection between the spring follower and certain of said plates to effect movement of said last named plates with respect to the remaining friction plates during the compression of the mechanism.

4. In a friction shock absorbing mechanism, the combination with a friction shell having interior friction surfaces; of a spring resistance; a spring follower; a plurality of intercalated, relatively movable friction elements co-operating with the friction shell; friction shoes; a main wedge co-operating with the friction shoes, said wedge being normally spaced from the spring follower and engageable therewith to effect movement thereof after a predetermined compression of the mechanism; and means on said spring follower co-operating with certain of the friction elements to effect movement thereof relative to the remaining elements.

5. In a friction shock absorbing mechanism, the combination with a friction shell having interior friction surfaces; of a plurality of intercalated, relatively movable friction plates co-operating with the shell; a spring resistance; a spring follower anchored to certain of said plates; friction shoes; a wedge spreading member co-operating with the spring follower to effect movement thereof, said wedge being normally spaced from the spring follower; and an additional spring resistance interposed between the spring follower and shoes, the shoes being normally spaced from the spring follower to provide for preliminary action during the initial compression of the mechanism.

6. In a friction shock absorbing mechanism, the combination with a friction shell having longitudinally disposed, interior, friction surfaces; of a main wedge; friction shoes co-operating with the wedge; means for yieldingly opposing movement of said shoes; a plurality of intercalated friction plates interposed between the shoes and the shell friction surfaces; certain of said plates being initially held stationary by said yielding means and movable by the wedge after a predetermined compression of the mechanism and the remaining plates having limited movement longitudinally of the shell in unison with the shoes to provide for preliminary action.

7. In a friction shock absorbing mechanism, the combination with a friction shell having longitudinally disposed, interior friction surfaces; of a main wedge; friction shoes co-operating with the wedge; means for yieldingly opposing movement of said shoes; a plurality of relatively movable intercalated friction plates interposed between the shoes and shell friction surfaces, certain of said plates being movable through the inward movement of the wedge and the remaining plates being yieldingly held against movement by said means during compression of the mechanism, said last named plates being tapered longitudinally to provide for differential action.

8. In a friction shock absorbing mechanism, the combination with a friction shell having interior opposed friction surfaces; of a movable friction plate co-operating with each friction surface; a friction plate co-operating with each movable plate, said last-named plate being laterally displaceable; means on the shell opposing movement of said last named plates during the compression of the mechanism; a pair of friction shoes frictionally engaging said last named plates; a main spring resistance; a spring follower, said spring follower being anchored to the first named plates; and an additional spring resistance interposed between the friction shoes and the spring follower.

9. In a friction shock absorbing mechanism, the combination with a column load sustaining member having friction surfaces thereon; of a plurality of intercalated, relatively movable friction plates co-operating with the column member; a wedge pressure transmitting friction system co-operating with the plates, said system including a wedge member and friction shoes; a main spring resistance; a spring follower co-operating with the shoes; and co-operating means on the spring follower and wedge member for effecting release of the latter.

10. In a friction shock absorbing mechanism, the combination with a friction shell; of longitudinally movable friction plates co-operating with the shell; a spring resistance; a spring follower anchored to said plates; additional plates co-operating with said first named plates, said additional plates being longitudinally movable to a limited extent with reference to the shell to provide for preliminary action; co-operating means on said additional plates and shell for positively limiting longitudinal movement of said additional plates; friction shoes co-operating with the additional plates; a wedge co-operating with the shoes, and an additional spring resistance interposed between the shoes and spring follower.

11. In a friction shock absorbing mechanism, the combination with a friction shell; of follower means, said shell and follower means being relatively movable; a wedge block co-operating with the follower means; a main spring resistance within the shell; a spring follower; a friction system co-operating with the friction shell, said system comprising a plurality of relatively movable elements having co-operating friction surfaces, said elements including friction shoes co-operating with the wedge; an additional spring resistance interposed between the spring follower and certain of said elements; and means on said wedge block normally spaced an appreciable distance from the spring follower to provide relative movement therebetween during the first part of the compression stroke of the mechanism, and adapted to engage and move the spring follower inwardly of the mechanism after a predetermined compression of the mechanism.

12. In a friction shock absorbing mechanism, the combination with a casing open at one end only; of detachable liners fixed to the casing, said liners having interior friction surfaces; friction elements longitudinally movable of said casing and frictionally co-operating with the liners, said elements having outward movement limited by engagement with said liners, said elements having limiting abutment faces thereon; a main spring resistance; a spring follower, said spring follower having means thereon co-operating with the abutment faces of said elements to connect the latter to the spring follower and limit outward movement of the spring follower with reference to the casing; additional friction elements co-operating with said first named friction elements; abutment means on the casing co-operating with said additional friction elements to limit movement thereof inwardly and outwardly longitudinally of the same and hold the same assembled with the shell; friction shoes co-operating with the additional friction elements; and means having wedging engagement with the friction shoes.

In witness that I claim the foregoing I have hereunto subscribed my name this 6th day of March 1926.

JOHN F. O'CONNOR.